United States Patent
Kim et al.

(10) Patent No.: US 10,468,732 B2
(45) Date of Patent: Nov. 5, 2019

(54) POLYMER ELECTROLYTE AND BATTERY INCLUDING THE SAME

(71) Applicant: Samsung Electronics Co., Ltd., Suwon-si, Gyeonggi-do (KR)

(72) Inventors: Kihyun Kim, Seoul (KR); Myungjin Lee, Seoul (KR); Heungchan Lee, Seongnam-si (KR); Dongjoon Lee, Suwon-si (KR); Hyunpyo Lee, Seoul (KR); Dongmin Im, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 198 days.

(21) Appl. No.: 15/149,445

(22) Filed: May 9, 2016

(65) Prior Publication Data

US 2017/0125868 A1 May 4, 2017

(30) Foreign Application Priority Data

Nov. 4, 2015 (KR) .................. 10-2015-0154766

(51) Int. Cl.
| | | |
|---|---|---|
| *H01M 12/06* | (2006.01) | |
| *H01M 10/0525* | (2010.01) | |
| *H01M 10/0565* | (2010.01) | |

(52) U.S. Cl.
CPC ....... *H01M 12/06* (2013.01); *H01M 10/0525* (2013.01); *H01M 10/0565* (2013.01); *H01M 2300/0082* (2013.01)

(58) Field of Classification Search
None
See application file for complete search history.

(56) References Cited

U.S. PATENT DOCUMENTS

| | | | |
|---|---|---|---|
| 5,698,138 A | 12/1997 | Visca et al. | |
| 7,435,495 B2 | 10/2008 | DeSimone et al. | |
| 8,383,276 B2 | 2/2013 | Muldoon et al. | |
| 8,802,301 B2 | 8/2014 | Halalay et al. | |
| 9,350,035 B2* | 5/2016 | Yadav ............ | H01M 8/1023 |
| 2002/0127475 A1* | 9/2002 | Marchionni ...... | C07C 309/10 |
| | | | 429/324 |
| 2011/0111308 A1 | 5/2011 | Halalay et al. | |
| 2011/0311881 A1* | 12/2011 | Benicewicz ....... | C08J 5/2262 |
| | | | 429/309 |
| 2015/0155566 A1* | 6/2015 | Kim ................. | H01M 4/9083 |
| | | | 252/514 |
| 2015/0288028 A1* | 10/2015 | DeSimone ........ | H01M 10/054 |
| | | | 429/402 |

(Continued)

FOREIGN PATENT DOCUMENTS

| | | |
|---|---|---|
| JP | 2006269374 A | 10/2006 |
| JP | 5480376 B2 | 2/2014 |
| KR | 1020050074431 A | 7/2005 |

OTHER PUBLICATIONS

Li et al., "The pursuit of rechargeable solid-state Li-air batteries", Energy & Environmental Science, vol. 6, 2013, pp. 2302-2311.

(Continued)

*Primary Examiner* — Tracy M Dove
(74) *Attorney, Agent, or Firm* — Cantor Colburn LLP

(57) ABSTRACT

A polymer electrolyte including: a polymer matrix including a cross-linked fluorine-containing polymer; and a liquid electrolyte embedded in the polymer matrix.

16 Claims, 9 Drawing Sheets

— CROSS-LINKED FLUORINE-CONTAINING POLYMER MATRIX
⊘ CROSS-LINKED SITE
▨ EMBEDDED LIQUID ELECTROLYTE
✦ LITHIUM ION

(56) References Cited

U.S. PATENT DOCUMENTS

2016/0028114 A1* 1/2016 Pratt .................. H01M 2/1673
　　　　　　　　　　　　　　　　　　　　　　　429/309
2016/0365606 A1* 12/2016 Sivanandan ...... H01M 10/0565

OTHER PUBLICATIONS

Priola et al, "UV-curable systems containing perfluoropolyether structures: synthesis and characterisation", Macromol.Chem.Phys., vol. 198, 1997, pp. 1893-1907.
Wong et al., "Nonflammable perfluoropolyether-based electrolytes for lithium batteries", PNAS, vol. 111, No. 9, Mar. 4, 2014, pp. 3327-3331.

* cited by examiner

— CROSS-LINKED FLUORINE-CONTAINING POLYMER MATRIX

⊘ CROSS-LINKED SITE

▭ EMBEDDED LIQUID ELECTROLYTE

☆Li⁺ LITHIUM ION

POLYMER ELECTROLYTE AND BATTERY INCLUDING THE SAME

CROSS-REFERENCE TO RELATED APPLICATION

This application claims priority to and the benefit of Korean Patent Application No. 10-2015-0154766, filed on Nov. 4, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a polymer electrolyte and a battery including the polymer electrolyte.

2. Description of the Related Art

A carbonate organic electrolyte, such as ethylene carbonate or propylene carbonate, has been used as an electrolyte for a lithium battery. However, the carbonate organic electrolyte has a high risk of leakage, and therefore, may have safety issues, for example, high flammability and explosiveness. In order to solve these problems, a solid electrolyte may be used as an electrolyte for a lithium battery.

In recent years, demand for a solid electrolyte has increased as a battery may be manufactured in various forms such as a thin film battery, a stack battery, or a flexible battery. The battery may also have a 3-dimensional structure. When the structure of a battery changes from 2-dimensional to 3-dimensional, a solid electrolyte that is suitable for a battery with a large surface area is desired.

Thus, there remains a need for a stable and non-flammable electrolyte for 3-dimensional batteries.

SUMMARY

Provided is a polymer electrolyte having high thermal stability and good flexibility.

Provided is a battery including the polymer electrolyte.

Additional aspects will be set forth in part in the description which follows and, in part, will be apparent from the description, or may be learned by practice of the presented embodiments.

According to an aspect of an embodiment, a polymer electrolyte includes a polymer matrix including a cross-linked fluorine-containing polymer; and a liquid electrolyte embedded in the polymer matrix.

In an embodiment, the fluorine-containing polymer may include at least one selected from a first repeating unit represented by Formula 1, a second repeating unit represented by Formula 2, and a third repeating unit represented by Formula 3:

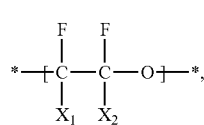

Formula 1

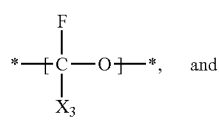

Formula 2, and

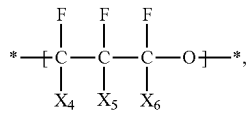

Formula 3 wherein, in Formulas 1 to 3, $X_1$ to $X_6$ are each independently —F or —$CF_3$.

In an embodiment, the cross-linkable functional group may be at least one selected from an acrylate group and a methacrylate group.

In an embodiment, the ionic liquid may include:

i) at least one cation selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation; and ii) an anion.

In an embodiment, a weight ratio of the polymer matrix and the liquid electrolyte may be in a range of about 90:10 to about 10:90.

In an embodiment, the polymer electrolyte may be a solid or gel.

According to an aspect of another embodiment, a battery includes the polymer electrolyte.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
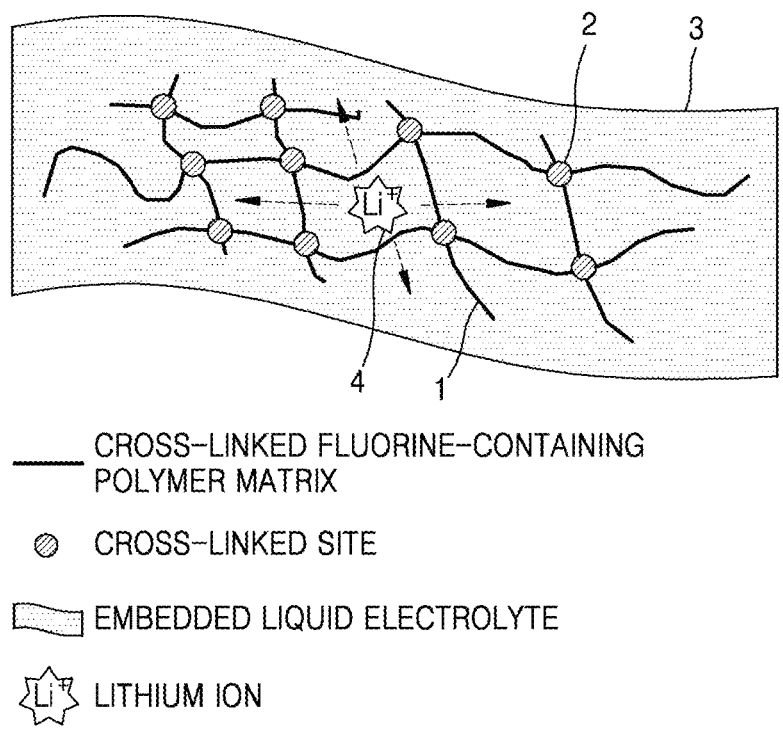
FIG. 1 is a schematic view illustrating a structure of a polymer electrolyte according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." As used herein, the terms such as "comprising", "including", "having", or the like are intended to indicate the existence of the features regions, integers, steps, operations, components, and/or elements disclosed in the specification, and are not intended to preclude the possibility that one or more other features or elements may exist or may be added.

It will also be understood that when an element such as a layer, a region or a component is referred to as being "on" another layer or element, it can be directly on the other layer or element, or intervening layers, regions, or components may also be present. In contrast, when an element is referred to as being "directly on" another element, there are no intervening elements present.

In the drawings, the sizes of elements are exaggerated or reduced for ease of description. The size or thickness of each element shown in the drawings are arbitrarily illustrated for better understanding or ease of description, and thus the present disclosure is not limited thereto.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, with reference to attached drawings, an electrolyte for a secondary battery, a method of preparing the electrolyte, and a secondary battery including the electrolyte according to an exemplary embodiment will be described in detail. However, these are for illustrative purposes only and are not intended to limit the scope of the inventive concept. The scope of the inventive concept is indicated by the claims rather than by the detailed description.

Hereinafter, a polymer electrolyte according to an embodiment and a battery including the polymer electrolyte is further disclosed.

The polymer electrolyte according to an embodiment includes:

a polymer matrix including a cross-linked fluorine-containing polymer; and a liquid electrolyte impregnated in the polymer matrix.

FIG. 1 is a schematic view illustrating a structure of a solid polymer electrolyte according to an embodiment.

As shown in FIG. 1, the polymer matrix includes a cross-linked fluorine-containing polymer 1. The fluorine-containing polymer includes cross-linked fluorine-containing monomers which are cross-linked at cross-link sites 2 to forms a net structure which serves as a frame of a polymer electrolyte. The cross-linked fluorine-containing polymer has high flexibility, and thus may be modified to have a disk structure or a 3-dimensional structure. Also, the fluorine-containing polymer has high thermal and chemical stability and no flammability, and thus may provide a polymer electrolyte with high stability at a high temperature. A liquid electrolyte 3 may be embedded therein. Lithium ions 4 can transport within the polymer electrolyte.

The fluorine-containing polymer may include at least one selected from a first repeating unit represented by Formula 1, a second repeating unit represented by Formula 2, and a third repeating unit represented by Formula 3 as a backbone:

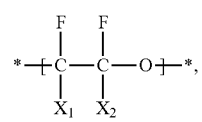

Formula 1

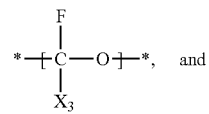

Formula 2 and

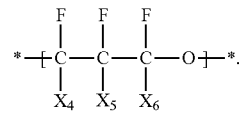

Formula 3

In Formulas 1 to 3, $X_1$ to $X_6$ are each independently fluorine (—F) or a trifluoromethyl group (—$CF_3$).

For example, the fluorine-containing polymer may include a repeating unit represented by Formula 1a and a repeating unit represented by Formula 2a as a backbone:

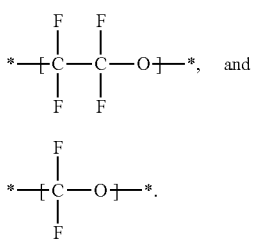

Formula 1a and

Formula 2a

The fluorine-containing polymer may be, for example, formed by cross-linking a monomer represented by Formula 4.

$$R_1O-[(CF_2-CF_2O)_m-(CF_2O)_n]-R_2 \quad \text{Formula 4}$$

In Formula 4, $R_1$ and $R_2$ are each independently an unsubstituted or substituted C1-C30 alkyl group, an unsubstituted or substituted C2-C30 alkenyl group, an unsubstituted or substituted C2-C30 alkynyl group, an unsubstituted or substituted C6-C30 aryl group, an unsubstituted or substituted C3-C30 heteroaryl group, an unsubstituted or substituted C4-C30 cycloalkyl group, or an unsubstituted or substituted C3-C30 heterocycloalkyl group, each including one to three cross-linkable functional groups, and m/n is in a range of about 0.1 to about 1,000.

The cross-linkable functional groups may be, for example, at least one selected from an acrylate group ($CH_2=CHC(=O)-$), and a methacrylate group ($CH_2=C(CH_3)C(=O)-$). It is also possible to employ other groups containing a terminal unsaturation, for example a vinyl group ($CH_2=CH-$) or an allyl group ($CH_2=CH_2CH-$). Such groups may be partially fluorinated, for example $CFH=CH-$ or $CH_2=CH_2CF_2-$.

The monomers represented by Formula 4 have a polyfunctional structure having two functional groups to six functional groups, and when the monomers are cross-linked a polymer matrix having a net structure may be formed.

A weight average molecular weight ($M_w$) of the monomer before cross-linking into the fluorine-containing polymer may be, for example, about 200 grams per mole (g/mol) or greater, or, for example, about 500 g/mol or greater, about 1,000 g/mol or greater, or about 10,000 g/mol or greater. For example, a weight average molecular weight ($M_w$) of the monomer before cross-linking into the fluorine-containing polymer may be, for example, in a range of about 200 g/mol to about 10,000,000 g/mol, for example, about 2,000 g/mol to about 1,000,000 g/mol, or about 20,000 g/mol to about 100,000 g/mol. In another example, a weight average molecular weight ($M_w$) of the monomer before cross-linking into the fluorine-containing polymer may be, for example, in a range of about 1,000 g/mol to about 1,000,000 g/mol, or about 100,000 g/mol to about 700,000 g/mol. The weight average molecular weight ($M_w$) is measured using gel permeation chromatography (GPC). While not wishing to be bound by theory, it is understood that when the weight average molecular weight of the monomer before cross-linking into the fluorine-containing polymer is within the above ranges, an electrolyte including the polymer may have improved chemical and physical characteristics.

The amount of fluorine in the monomer before cross-linking into the fluorine-containing polymer may be, for example, in a range of about 10 percent by weight (wt %) to about 90 wt %, for example, about 15 wt % to about 85 wt %, or about 20 wt % to about 80 wt %, based on a total weight of the monomer. While not wishing to be bound by theory, it is understood that when the amount of fluorine in the monomer is within the above range, a surface energy of the polymer electrolyte decreases, and thus contact with moisture, which is an impurity, may be blocked.

The polymer matrix is porous, which helps impregnation of liquid electrolyte into the polymer matrix, and thus the polymer matrix may have suitable ion conductivity.

The liquid electrolyte may include at least one selected from an ionic liquid and an organic solvent.

The ionic liquid refers to a salt in the state of a liquid at room temperature or a room temperature melting salt that has a melting point at about room temperature or lower and consists of only ions. The ionic liquid has almost no vapor pressure and is not flammable, and thus thermal stability of the ionic liquid is advantageous. In this regard, thermal stability of the solid polymer electrolyte may improve the thermal stability of a battery.

The ionic liquid may include, for example, i) at least one cation selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation; and ii) an anion.

For example, the anion may include at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$, but embodiments are not limited thereto.

For example, the ionic liquid may comprise at least one cation selected from a straight or branched substituted ammonium cation, a straight or branched substituted imidazolium cation, a straight or branched substituted pyrrolidinium cation, and a straight or branched substituted piperidinium cation, and an anion.

For example, the ionic liquid may include at least one of an ionic liquid represented by Formula 5 and an ionic liquid represented by Formula 6.

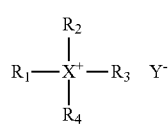

Formula 5

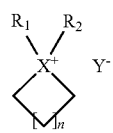

Formula 6

In Formulae 5 and 6,

X is at least one selected from N, P, and As;

$R_1$ to $R_4$ are each independently a hydrogen, an unsubstituted or substituted C1-C30 alkyl group, an unsubstituted or substituted C1-C30 alkoxy group, an unsubstituted or substituted C1-C30 heteroalkyl group, an unsubstituted or substituted C6-C30 aryl group, an unsubstituted or substituted C6-C30 aryloxy group, an unsubstituted or substituted C7-C30 arylalkyl group, an unsubstituted or substituted C3-C30 heteroaryl group, an unsubstituted or substituted C3-C30 heteroaryloxy group, an unsubstituted or substituted C4-C30 heteroarylalkyl group, an unsubstituted or substituted C4-C30 cycloalkyl group, or an unsubstituted or substituted C3-C30 heterocycloalkyl group;

n is in a range of 1 to 4; and $Y^-$ is an anion.

For example, the ionic liquid may include at least one selected from a quaternary ammonium ionic liquid represented by Formula 5a, a pyrrolidinium ionic liquid represented by Formula 6a, and a piperidinium ionic liquid represented by Formula 6b.

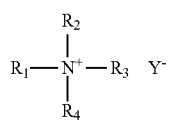

Formula 5a

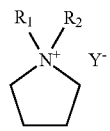

Formula 6a

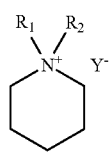

Formula 6b

In Formulas 5a, 6a, and 6b, $R_1$ to $R_4$ are each independently a hydrogen, an unsubstituted or substituted C1-C30 alkyl group, an unsubstituted or substituted C1-C30 alkoxy group, an unsubstituted or substituted C1-C30 heteroalkyl group, an unsubstituted or substituted C6-C30 aryl group, an unsubstituted or substituted C6-C30 aryloxy group, an unsubstituted or substituted C7-C30 arylalkyl group, an unsubstituted or substituted C3-C30 heteroaryl group, an unsubstituted or substituted C3-C30 heteroaryloxy group, an unsubstituted or substituted C4-C30 heteroarylalkyl group, an unsubstituted or substituted C4-C30 cycloalkyl group, or an unsubstituted or substituted C3-C30 heterocycloalkyl group;

n is in a range of 1 to 4; and $Y^-$ is an anion.

The anion in the formula of the ionic liquid is the same as described above.

For example, the ionic liquid may comprise at least one selected from diethyl methyl ammonium trifluoromethane sulfonate ([DEMA][TFO]), dimethyl propyl ammonium trifluoromethane sulfonate ([DMPA][TFO]), N,N-diethyl-N-methyl-N-(2-methoxyethyl)ammonium bis(trifluoromethane sulfonyl)imide ([DEMA][TFSI]), N-methyl-N-propyl piperidinium bis(trifluoromethane sulfonyl)imide ([PP13][TFSI]), N-butyl-N-methyl pyrrolidinium bis(trifluoromethane sulfonyl)imide ([Py14][TFSI]), and methyl propyl piperidinium trifluoromethane sulfonyl imide ([mpp][TFSI]), but embodiments are not limited thereto, and any suitable ionic liquid available in the art may be used.

The organic solvent may include at least one selected from a carbonate solvent, a glyme solvent, an ether solvent, and ester solvent, a dioxolane solvent, and a dioxane solvent.

The carbonate solvent may include at least one selected from ethylene carbonate, propylene carbonate, dimethyl carbonate, fluoroethylene carbonate, diethyl carbonate, and ethyl methyl carbonate.

The glyme solvent may include at least one selected from poly(ethylene glycol) dimethyl ether (PEGDME, polyglyme), tetra(ethylene glycol) dimethyl ether (TEGDME, tetraglyme), tri(ethylene glycol) dimethyl ether (triglyme), poly(ethylene glycol) dilaurate (PEGDL), poly(ethylene glycol) monoacrylate (PEGMA), and poly(ethylene glycol) diacrylate (PEGDA).

The ether solvent may comprise an acyclic ether solvent, such as at least one selected from diethyl ether, methyl butyl ether, and dibutyl ether, and a cyclic ether solvent, such as tetrahydrofuran.

The ester solvent may comprise at least one selected from ethyl acetate, and butyl acetate.

The dioxolane solvent may include at least one selected from 3-dioxolane, 4,5-diethyl-dioxolane, 4,5-dimethyl-dioxolane, 4-methyl-1,3-dioxolane, and 4-ethyl-1,3-dioxolane.

A dioxane solvent may include 1,4-dioxane.

The liquid electrolyte may further include a lithium salt.

The lithium salt may function as a source of lithium ions in the polymer electrolyte, and, for example, may promote movement of lithium ions between a positive electrode and a negative electrode in a lithium battery.

For example, the lithium salt may be at least one selected from $LiPF_6$, $LiBF_4$, $LiSbF_6$, $LiAsF_6$, $LiN(SO_2C_2F_5)_2$, $LiN(SO_2F_2)_2$, $Li(CF_3SO_2)_2N$ (LiTFSI), $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are each independently a natural number), LiF, LiBr, LiCl, LiI, and $LiB(C_2O_4)_2$ (lithium bis(oxalato) borate), but embodiments are not limited thereto, and any suitable lithium salt available in the art may be used.

When the polymer electrolyte is used in a lithium air battery among lithium batteries, the lithium salt may be a lithium sulfonimide compound.

The lithium sulfonimide compound may include at least one selected from lithium fluoroalkyl sulfonimide, lithium fluoroaryl sulfonimide, and lithium fluoroalkylaryl sulfonimide.

For example, the lithium sulfone imide compound may include $Li(FSO_2)_2N$, $Li(CF_3SO_2)_2N$, $Li(C_2F_5SO_2)_2N$, $LiN(C_pF_{2p+1}SO_2)(C_qF_{2q+1}SO_2)$ (wherein, p and q are different from each other, and p and q are each independently an integer of 1 to 20), $LiN((SO_2)_2C_pF_{2p})$ (wherein, p is an integer of 1 to 10), $Li(C_6F_5SO_2)_2N$, $Li(C_{10}F_7SO_2)_2N$, $Li(C_6F_5SO_2)(C_{10}F_7SO_2)N$, $LiN(C_6F_5SO_2)(C_pF_{2p+1}SO_2)$ (wherein, p is an integer of 1 to 10), or $LiN(C_{10}F_7SO_2)(C_pF_{2p+1}SO_2)$ (wherein, p is an integer of 1 to 10).

The amount of the lithium salt may be in a range of about 0.01 moles (mol) to about 10 mol, for example, about 0.1 mol to about 10 mol, or about 1 mol to about 10 mol, based on the total amount of the liquid electrolyte. While not wishing to be bound by theory, it is understood that when the amount of the lithium salt is within the above range, the electrolyte has appropriate conductivity and viscosity, and thus electrolyte performance may be improved, and lithium ions may move effectively.

In some embodiments, a weight ratio of the polymer matrix and the liquid electrolyte may be in a range of about 95:5 to about 5:95. For example, a weight ratio of the polymer matrix and the liquid electrolyte may be in a range of about 90:10 to about 10:90, or, for example about 85:15 to about 15:85. While not wishing to be bound by theory, it is understood that when the weight ratio of the polymer matrix and the liquid electrolyte is within the above ranges, the polymer electrolyte may have improved ion conductivity and mechanical and/or physical properties.

The polymer electrolyte may be in the form of a solid or gel.

Also, the polymer electrolyte has suitable layer forming properties, and thus the polymer electrolyte itself may be provided as a free-standing layer. A thickness of the polymer electrolyte may be about 200 micrometers (μm) or less, or, for example, in a range of about 0.1 μm to about 100 μm, or, for example, about 1 μm to about 40 μm, and may be in the form of a layer, a film, or a sheet. While not wishing to be bound by theory, it is understood that when the thickness of the polymer electrolyte is within the above ranges, the polymer electrolyte may have suitable flexibility, and, at the same time, a free-standing layer having suitable mechanical physical property may be formed.

The polymer electrolyte in the form of a sheet, a film, or a layer may be prepared using a technique such as spin coating, roll coating, curtain coating, spray, casting, screen printing, or inkjet printing, the details of which can be determined by one of skill in the art without undue experimentation.

Further, the polymer electrolyte may have a 3-dimensional structure as well as a 2-dimensional structure.

The polymer electrolyte may be used as a solid polymer electrolyte for an all-solid battery, and the polymer electrolyte may be used as an electrolyte of a lithium battery, such as a lithium sulfur battery, a lithium air battery, a lithium ion battery, a lithium polymer battery, or a lithium metal battery.

Hereinafter, according to another embodiment, a method of preparing the polymer electrolyte is further disclosed.

The polymer electrolyte may be, for example, obtained as follows.

First, a composition for forming a polymer electrolyte may be prepared by mixing monomers for forming a fluorine-containing polymer including at least one of a first repeating unit represented by Formula 1, a second repeating unit represented by Formula 2, and a third repeating unit represented by Formula 3; and a liquid electrolyte.

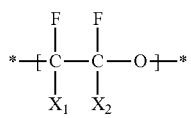

Formula 1

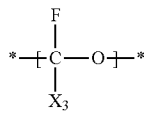

Formula 2

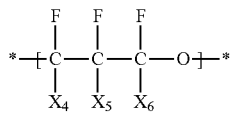

Formula 3

In Formulas 1 to 3, $X_1$ to $X_6$ are each independently fluorine (—F) or a trifluoromethyl group (—$CF_3$).

For example, the monomer for forming a fluorine-containing polymer may be represented by Formula 4.

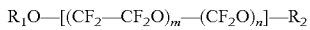

Formula 4

In Formula 4, $R_1$ and $R_2$ are each independently an unsubstituted or substituted C1-C30 alkyl group, an unsubstituted or substituted C2-C30 alkenyl group, an unsubstituted or substituted C2-C30 alkynyl group, an unsubstituted or substituted C6-C30 aryl group, an unsubstituted or substituted C3-C30 heteroaryl group, an unsubstituted or substituted C4-C30 cycloalkyl group, or an unsubstituted or substituted C3-C30 heterocycloalkyl group, each including one to three cross-linkable functional groups; and m and n are integers, selected in such a way that m/n is in a range of about 0.1 to about 1,000.

For example, the cross-linkable functional group may be at least one selected from an acrylate group and a methacrylate group.

The liquid electrolyte includes at least one selected from an ionic liquid, an organic solvent, and a lithium salt.

The composition may be polymerized. The polymerization may be performed by providing heat or light.

In this regard, a polymerization initiator is added to the composition.

The polymerization initiator may be a light polymerization initiator or a heat polymerization initiator. The light polymerization initiator may be any compound that generates radicals by absorbing light, such as ultraviolet light. The light radical initiator may be a free radical photoinitiator and/or an ionic photoinitiator. Examples of the light polymerization initiator may include at least one selected from 2-hydroxy-2-methyl-1-phenyl-propan-1-one (HMPP), benzoin and its derivatives such as benzoin ether, acetophenone and its derivatives such as dialkyl acetophenone, hydroxyl alkyl ketone, phenyl glyoxylate, benzyl ketal such as benzyl dimethyl ketal, acyl phosphine, α-aminoketone. In some embodiments, an example of acyl phosphine may be a commonly used lucirin TPO, e.g., 2,4,6-trimethyl-benzoyl-trimethyl phosphine oxide.

The heat polymerization initiator may be at least one selected from a persulfate initiator, an azo initiator, a peroxide initiator, and an ascorbic acid initiator. In particular, examples of the persulfate initiator may include sodium persulfate ($Na_2S_2O_8$), potassium persulfate ($K_2S_2O_8$), and ammonium persulfate (($NH_4$)$_2S_2O_8$), and examples of the azo initiator may include 2,2-azobis(2-amidinopropane)dihydrochloride, 2,2-azobis-(N,N-dimethylene)isobutyramidine dihydrochloride, 2-(carbamoylazo)isobutylonitrile, 2,2-azobis[2-(2-imidazolin-2-yl)propane] dihydrochloride, and 4,4-azobis-(4-cyanovaleric acid). The amount of the polymerization initiator may be in a range of about 0.005 parts to about 5.0 parts by weight, for example, about 0.05 parts to about 5.0 parts by weight, or about 0.5 parts to about 5.0 parts by weight, based on 100 parts by weight of the monomers represented by Formula 4. While not wishing to be bound by theory, it is understood that when the amount of the polymerization initiator is within the above ranges, reactivity of the polymerization may be improved.

The composition may further include an organic solvent to control viscosity or to exhibit other useful effects. Examples of the organic solvent may include at least one selected from tetrahydrofuran (THF), N-methylpyrrolidone (NMP), acetonitrile, benzonitrile, 2-methyltetrahydrofuran, γ-butyrolactone, dioxolane, 4-methyldioxolane, N,N-dimethylformamide, N,N-dimethylacetamide, N,N-dimethyl sulfoxide, 1,4-dioxane, 1,2-dimethoxyethane, sulfolane, dichloroethane, chlorobenzene, nitrobenzene, diethylene glycol, and dimethyl ether. The amount of the organic solvent may be in a range of about 100 parts to about 3,000 parts by weight, for example, about 500 parts to about 3,000 parts by weight, or about 1,000 parts to about 3,000 parts by weight, based on 100 parts by weight of monomers for forming a fluorine-containing polymer.

The light used in the polymerization of the polymer electrolyte may be ultraviolet (UV) light. When the polymerization is performed using light, deformation of a lithium metal thin film by heat may be prevented even when the electrolyte is formed on the lithium metal thin film.

A time period for performing the polymerization (cross-linking) in the presence of light or heat may vary, but, in some embodiments, the time period may be, for example, in a range of about 1 minute to about 30 minutes, for example, about 5 minutes to about 30 minutes, or about 10 minutes to about 30 minutes. When the polymer electrolyte in the form of a layer is prepared by using the composition, the composition may be coated and dried on a substrate to form a layer on the substrate, and the layer may be separated from the substrate, thereby completing preparation of the polymer electrolyte.

The composition may be coated on the substrate using a method commonly used in the formation of a polymer electrolyte. For example, the composition may be coated on the substrate by spin coating, roll coating, curtain coating, extruding, casting, screen printing, inkjet printing, or using a doctor blade.

The polymerization may be performed at a temperature in a range of about 30° C. to about 80° C., for example, about 35° C. to about 60° C., or, for example, about 40° C., and the polymerization time may be changed depending on the polymerization temperature. For example, the polymerization may be performed for about 8 hours to about 20 hours, for example, about 10 hours to about 18 hours, or, for example, about 15 hours.

When the disclosed method is used, the polymer electrolyte may be prepared at improved manufacturing cost, and the process of manufacturing the polymer electrolyte may be facilitated, which may allow economical production of a large amount of the polymer electrolyte.

According to another aspect of an embodiment, provided is a battery including the polymer electrolyte.

The battery may be an electrochemical energy storage device, which may be, for example, a lithium battery such as a lithium sulfur battery, a lithium ion battery, a lithium air battery, or a lithium polymer battery.

Also, the battery may be a metal air battery, such as a lithium air battery, a sodium air battery, or a magnesium air battery.

Figure 2:
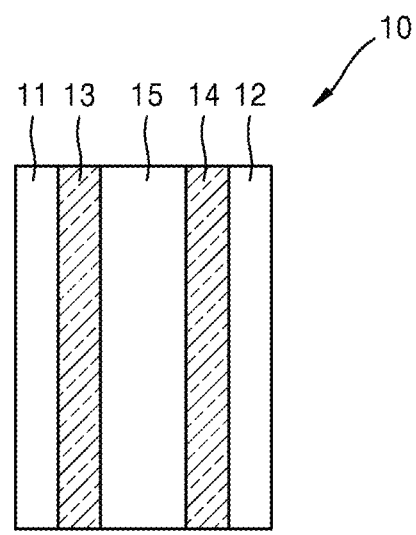
FIG. 2 is a schematic cross-sectional view of a structure of a lithium air battery according to an embodiment.

FIG. 2 is a schematic view of an example of a lithium air battery 10. Referring to FIG. 2, the lithium air battery 10 includes a first current collector 11, a second current collector 12, a positive electrode 13, a negative electrode 14, and a first electrolyte 15 disposed between the positive electrode 13 and the negative electrode 14.

The positive electrode 13 is formed on the first current collector 11 at which oxidation and reduction of oxygen occurs by using oxygen as an active material. The negative electrode 14 is formed on the second current collector 12 at which oxidation and reduction of a lithium metal occurs. The first electrolyte 15 allows conduction of lithium ions between the positive electrode 13 and the negative electrode 14.

The first and second current collectors 11 and 12 may have a porous structure having a net shape or a mesh shape to increase the rate of diffusing oxygen, or the current collector may be a porous metal plate of stainless steel, nickel, or aluminum, but embodiments are not limited thereto, and any suitable current collector available in the art may be used. The first and second current collectors 11 and 12 may be coated with an oxidation resistant metal or an alloy coating layer to prevent oxidation of the first and second current collectors 11 and 12.

The current collector may comprise a metal such as at least one selected from nickel, aluminum, titanium, copper, gold, silver, platinum, zinc, tin, and an alloy thereof, or stainless steel. A shape of the current collector is not particularly limited. For example, the current collector may have at least one selected from a thin film shape, a flat plate shape, a mesh shape, a net shape, a punched shape, and an embossing shape, e.g. a mesh shape flat plate or the like. For example, the current collector may have an uneven surface formed by etching.

The positive electrode 13 using oxygen as a positive electrode active material may be a porous carbonaceous material, and any suitable material having porosity and conductivity may be used as the positive electrode 13. For example, the positive electrode 13 may be a carbonaceous material having pores. Examples of the carbonaceous material may include at least one selected from carbon black, graphite, graphene, activated carbons, carbon nanotubes, and carbon fibers. For example, the positive electrode 13 may comprise a metallic conductive material such as metal fiber or metal mesh. Also, the positive electrode 13 may include a metallic powder of at least one selected from copper, silver, nickel, and aluminum. The positive electrode 13 may be an organic conductive material such as a polyphenylene derivative. The conductive material may be used alone or as a combination thereof.

A catalyst for promoting oxidation/reduction of oxygen may be added to the positive electrode 13, and examples of the catalyst may include a rare-earth metal catalyst such as platinum, gold, silver, palladium, ruthenium, rhodium, or osmium; an oxide catalyst such as a manganese oxide, an iron oxide, a cobalt oxide, or a nickel oxide; or an organic metal catalyst such as cobalt phthalocyanine, but embodiments are not limited thereto, and any suitable oxidation/reduction catalyst of oxygen available in the art may be used.

Further, the catalyst may be contained in a carrier. The carrier may be an oxide, a zeolite, a clay mineral, or carbon. The oxide may include at least one oxide selected from alumina, silica, zirconium oxide, and titanium dioxide. The oxide may include at least one metal selected from cesium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). The carbon may be carbon black such as Ketjen black, acetylene black, channel black, or lamp black; graphite such as natural graphite, artificial graphite, or expanded graphite; active carbon; or carbon fibers, but embodiments are not limited thereto, and any suitable material available as a carrier in the art may be used.

The positive electrode 13 may further include a binder. The binder may include a thermoplastic polymer or a thermosetting polymer. The binder may include, for example, at least one selected from polyethylene, polypropylene, polytetrafluoroethylene (PTFE), polyvinylidene fluoride (PVDF), styrene-butadiene rubber, tetrafluoroethylene-perfluoroalkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethyl vinyl ether-tetrafluoroethylene copolymer, and ethylene-acrylic acid copolymer. The foregoing may be used alone or as a mixture thereof, but the binder is not limited thereto, and any suitable material available as a binder in the art may be used.

For example, the positive electrode 13 may be prepared by mixing an oxygen oxidation/reduction catalyst, a conductive material, and a binder to prepare a positive electrode slurry, and then coating and drying the slurry on a surface of the first current collector 11; or by optionally press-molding the slurry with the first current collector 11 to improve electrode density. The positive electrode 13 may optionally include a lithium oxide. Optionally, the oxygen oxidation/reduction catalyst may be omitted.

The negative electrode 14 includes a lithium metal, a lithium alloy, or a material capable of intercalating or deintercalating lithium, but embodiments are not limited thereto. The negative electrode 14 effectively determines a capacity of the lithium air battery. The lithium alloy may be, for example, an alloy of at least one selected from lithium and aluminum, tin, magnesium, indium, calcium, germanium, antimony, bismuth, and lead.

The first electrolyte 15 includes the polymer electrolyte.

A part of or an entirety of the first electrolyte 15 may be embedded in the positive electrode 13, which has pores.

Figure 3:
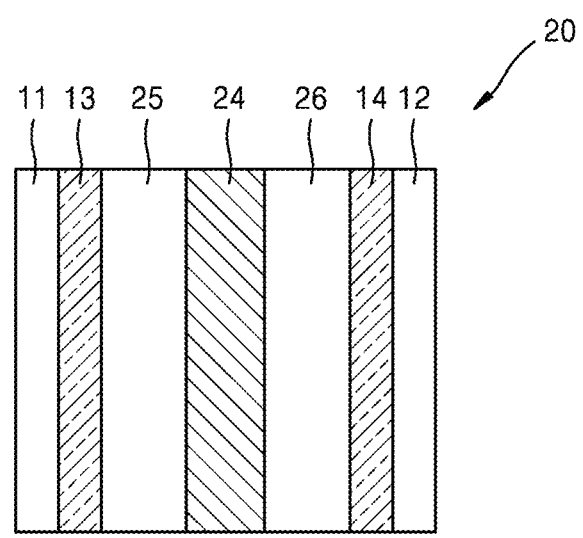
FIG. 3 is a schematic view of a structure of a lithium secondary battery according to an embodiment.

FIG. 3 illustrates a structure of a lithium air battery 20 according to another embodiment.

Referring to FIG. 3, the lithium air battery cell 20 includes a first current collector 11, a second current collector 12, a positive electrode 13, a negative electrode 14, a separator 24 disposed between the positive electrode 13 and the negative electrode 14, a first electrolyte 25 disposed between the positive electrode 13 and the separator 24, and a second electrolyte 26 disposed between the negative electrode 14 and the separator 24.

In FIG. 3, the negative electrode 14, the second electrolyte 26, and the separator 24 may be all together referred to as a protective negative electrode. The positive electrode 13, the negative electrode 14, and the first electrolyte 25 shown in FIG. 3 correspond to the positive electrode 13, the negative electrode 14, and the first electrolyte 15 shown in FIG. 2, and thus the detailed description thereof is omitted herein.

The second electrolyte 26 may be a non-aqueous electrolyte.

The separator 24 may be at least one selected from an inorganic solid electrolyte layer, a polymer solid electrolyte layer, and a gel-type polymer electrolyte. The separator 24 has lithium ion conductivity.

The inorganic solid electrolyte layer may be, for example, $Cu_3N$, $Li_3N$, or LiPON.

The polymer solid electrolyte layer may include polyethylene oxide, polyacrylonitrile, or polyester.

The polymer solid electrolyte layer may be prepared by, for example, mixing the lithium ion conductive polymer and a lithium salt together.

The lithium salt may be at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where, x and y are each independently a natural number), LiF, LiBr, LiCl, LiI, and $LiB(C_2O_4)_2$ (lithium bis(oxalato) borate) (LiBOB).

Also, the solid electrolyte layer may be a glass-ceramic solid electrolyte, or a stack of a glass-ceramic solid electrolyte and a polymer solid electrolyte. The "glass-ceramic" is a polycrystalline material produced through controlled crystallization of base glass. The lithium ion conductive solid electrolyte layer will be described in further detail.

The lithium ion conductive solid electrolyte layer may comprise at least one selected from a lithium ion conductive glass, lithium ion conductive crystals (ceramic or glass-ceramic), and an inorganic material. In consideration of chemical stability, an example of the lithium ion conductive solid electrolyte layer may be an oxide.

When the lithium ion conductive solid electrolyte layer includes a large amount of the lithium ion conductive crystals, an ion conductivity of the lithium ion conductive solid electrolyte layer may be improved, and thus the amount of the ion conductive crystals may be, for example, about 50 wt % or greater, about 60 wt % or greater, or about 70 wt % or greater, or 50% to 90%, based on the total amount of the lithium ion conductive solid electrolyte layer.

Examples of the lithium ion conductive crystals include perovskite crystals with lithium ion conductivity, such as $Li_3N$, LISICON, or $La_{0.55}Li_{0.35}TiO_3$, $LiTi_2P_3O_{12}$ crystals having a NASICON-type structure, and glass-ceramic that deposits these crystals.

For example, the lithium ion conductive crystals may be $Li_{1+x+y}(Al_aGa_{1-a})_x(Ti_bGe_{1-b})_{2-x}Si_yP_{3-y}O_{12}$ (wherein, 0≤x≤1 and 1≤y≤1, 0≤a≤1 and 0≤b≤1, or, for example, 0≤x≤0.4 and 0≤y≤0.6, or, for example, 0.1≤x≤0.3 and 0.1≤y≤0.4). When the crystals are crystals not including grain boundaries that inhibit ionic conductivity, the lithium ion conductive crystals may be glass in terms of conductivity. For example, glass-ceramic barely contains pores or grain boundaries that inhibit ion conductivity, and thus may have high ionic conductivity and chemical stability.

Examples of the lithium ion conductive glass-ceramic include lithium-aluminum-germanium-phosphate (LAGP) salt, lithium-aluminum-titanium-phosphate (LATP) salt, and lithium-aluminum-titanium-silicon-phosphate (LATSP) salt.

For example, when parent glass having a composition of $Li_2O$—$Al_2O_3$—$TiO_2$—$SiO_2$—$P_2O_5$ is crystallized by a heat-treatment, the main crystal phase of the parent glass includes $Li_{1+x+y}Al_xTi_{2-x}Si_yP_{3-y}O_{12}$ (wherein 0≤x≤1 and 0≤y≤1). In this regard, x and y may satisfy the conditions: 0≤x≤0.4 and 0≤y≤0.6. For example, x and y may satisfy the conditions: 0.1≤x≤0.3 and 0.1≤y≤0.4.

The expression "pores or grain boundaries that inhibit ionic conductivity" as used herein refers to ionic conductivity-inhibiting materials, such as pores or grain boundaries that reduce the conductivity of an inorganic material including lithium ion conductive crystals to a tenth or less with respect to the conductivity of the lithium ion conductive crystals contained in the inorganic material.

The glass-ceramic refers to a material obtained by heat treating to deposit a crystalline phase in a glass phase. The glass-ceramic may include materials containing amorphous solid and crystals and also include materials in which all glass phases are phase-transited to crystalline phases, for example, materials in which the amount of crystals is 100 wt %. In the completely (100%) crystallized materials, almost no holes exist between crystal particles or in crystals.

The lithium ion conductive solid electrolyte layer includes a large amount of the glass ceramic and thus may have high ionic conductivity. Therefore, 80 wt % or greater of lithium ion conductive glass ceramic may be included in the lithium ion conductive solid electrolyte layer. To obtain higher ionic conductivity, the amount of the lithium ion conductive glass ceramic in the lithium ion conductive solid electrolyte layer may be 85 wt % or greater, or 90 wt % or greater, for example 50 wt % to 99.9 wt %, or 60 wt % to 99 wt %, based on a total weight of the lithium ion conductive glass ceramic.

A $Li_2O$ component included in the glass-ceramic provides a $Li^+$ ion carrier and is used to obtain lithium ion conductivity. The amount of the $Li_2O$ component may be for example, about 12 wt % or greater, about 13 wt % or greater, or about 14 wt % or greater, for example about 10 wt % to about 20 wt %, based on a total weight of the glass-ceramic. When the amount of the $Li_2O$ component is excessive, thermal stability of the glass may easily degrade, and conductivity of the glass-ceramic may easily deteriorate. Therefore, the upper limit of the amount of the $Li_2O$ component may be about 18 wt %, about 17 wt %, or about 16 wt %, based on a total weight of the glass-ceramic.

An $Al_2O_3$ component included in the glass-ceramic increases the thermal stability of a parent glass and also effectively increases lithium ion conductivity such that $Al^{3+}$ ions are introduced into the crystalline phase. The amount of the $Al_2O_3$ component may be from about 5 wt %, for example, about 5.5 wt %, or about 6 wt %, based on a total weight of the glass-ceramic. When the amount of the $Al_2O_3$ component is greater than about 10%, thermal stability of the glass may easily degrade, and conductivity of the glass-ceramic may easily deteriorate. Therefore, the upper limit of the amount of the $Al_2O_3$ component may be about 10%, about 9.5%, or about 9%, based on a total weight of the glass-ceramic.

A $TiO_2$ component included in the glass-ceramic contributes to the formation of glass, is a constituent of the crystalline phase, and is an essential component in glass and the crystals. The amount of the $TiO_2$ component may be from about 35% for example, about 36%, or about 37%. When the amount of the $TiO_2$ component is excessive, thermal stability of the glass may easily degrade, and conductivity of the glass-ceramic may easily deteriorate. Therefore, the upper limit of the amount of the $Ti_2O$ component may be about 45%, about 43%, or about 42%, based on a total weight of the glass-ceramic.

An $SiO_2$ component included in the glass-ceramic may increase the melting properties and thermal stability of a parent glass and also contributes to improving lithium ion conductivity, as $Si^{4+}$ ions are introduced into the crystalline phase. The amount of the $SiO_2$ component may be from about 1%, for example, about 2%, or about 3%. When the amount of the $SiO_2$ component is excessive, conductivity of the glass-ceramic may easily deteriorate. Therefore, the upper limit of the amount of the $Si_2O$ component may be about 10%, about 8%, or about 7%, based on a total weight of the glass-ceramic.

A $P_2O_5$ component included in the glass-ceramic is used to form glass and a constituent of the crystalline phase. When the amount of the $P_2O_5$ component is lower than 30%, the glass-ceramic may not be glassified. Thus, the lower limit of the amount of the $P_2O_5$ component may be, for example, about 30%, about 32%, or about 33%, based on a total weight of the glass-ceramic. When the amount of $P_2O_5$ component is greater than 40%, the crystalline phase may not precipitate from the glass, and the desired characteristics may not be obtained. Thus, the upper limit of the amount of the $P_2O_5$ component may be about 40%, about 39%, or about 38%, based on a total weight of the glass-ceramic.

In the case of the parent glass containing the components described above, glass may be easily obtained by casting a melted glass, and glass-ceramic with the crystal line phase which is obtained by heat treating the glass may have high lithium ion conductivity, i.e., $1 \times 10^{-3}$ Siemens per centimeter (S/cm).

Also, if glass-ceramic having a similar crystalline structure is used, part or all of the components may be substituted. For example, the $Al_2O_3$ component may be substituted with a $Ga_2O_3$ component, and the $TiO_2$ component may be substituted with a $GeO_2$ component. Moreover, when the glass-ceramic is prepared, a small amount of other raw materials may be added in a certain amount that does not largely deteriorate ionic conductivity in order to reduce the melting point of the glass-ceramic or increase the stability of glass.

The lithium ion conductive solid electrolyte layer may further include a polymer solid electrolyte component, in addition to the glass-ceramic component. The polymer solid electrolyte can be a lithium salt-doped polyethylene oxide, and examples of the lithium salt include at least one selected from $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_6)_2$, $LiC(SO_2CF_3)_3$, $LiN(SO_3CF_3)_2$, $LiC_4F_9SO_3$, and $LiAlCl_4$.

The polymer solid electrolyte layer may have a laminated structure including the glass-ceramic. For example, the glass-ceramic may be interposed between a first polymer solid electrolyte and a second polymer solid electrolyte.

The lithium ion conductive solid electrolyte layer may be in a single layer or multilayer form.

The second electrolyte 26 may be disposed between the negative electrode 14 and the separator 24 of the lithium ion conductive solid electrolyte layer. The second electrolyte 26 may be a liquid electrolyte including a non-aqueous organic solvent and a lithium salt, or including an aqueous solvent and a lithium salt; an inorganic solid electrolyte such as $Cu_3N$, $Li_3N$, or LiPON (lithium phosphorous oxynitride); a polymer electrolyte layer, or a combination thereof. When the second electrolyte 26 is a solid electrolyte layer, the second electrolyte 26 may substitute the separator 24. Also, the second electrolyte 26 may be formed of the same material used to form the first electrolyte 25.

Examples of the non-aqueous solvent may include at least one selected from methyl ether, diethyl ether, ethyl ether, dibutyl ether, glycol dimethyl ether, tetraethylene glycol dimethyl ether; cyclohexanone, 1,4-dioxane; dimethoxyethane, 2-methyltetrahydrofuran, 2-dimethyltetrahydrofuran, 5-dimethyltetrahydrofuran, tetrahydrofuran; methyl acetate, ethyl acetate, n-propyl acetate, dimethyl acetate, methyl propionate, ethyl propionate; methyl or ethyl formate; dimethyl carbonate, diethyl carbonate, ethyl methyl carbonate, dipropyl carbonate, methyl propyl carbonate, ethyl propyl carbonate, ethylene carbonate, propylene carbonate, butylene carbonate, polyethylene carbonate; γ-butyrolactone, decanolide, valerolactone, mevalonolactone, caprolactone; diglyme, triglyme, tetraglyme; acetonitrile, benzonitrile, nitromethane, nitrobenzene, triethylamine, triphenyl amine, tetraethylene glycol diamine; N,N-dimethylformamide, N,N-diethylformamide, N-methylpyrrolidone; dimethyl sulfone, tetramethylene sulfone, triethyl phosphine oxide, 1,3-dioxolane, and sulfolane.

The lithium air batteries 10 and 20 operate as follows. Lithium provided from the negative electrode 14 during discharging reacts with oxygen introduced from the positive electrode 13 to produce a lithium oxide, while oxygen is reduced (oxygen reduction reaction: ORR). Also, on the other hand, while the lithium oxide is reduced during charging, oxygen is oxidized, and thus may be generated as oxygen gas (oxygen evolution reaction: OER).

When the electrolyte is a non-aqueous electrolyte, the reaction mechanism may be represented by Reaction Scheme 1.

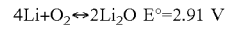

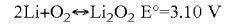
Reaction Scheme 1

When the electrolyte is an aqueous electrolyte, the reaction mechanism may be Reaction Scheme 2.

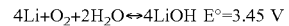
Reaction Scheme 2

The term "air" as used herein is not limited to atmospheric air, and refers to either a gas combination including oxygen or a pure oxygen gas. The broad definition of the term "air" may be applied to all kinds of applications including an air battery, or an air positive electrode.

The lithium air battery may be a lithium primary battery or a lithium secondary battery. Also, the shape of the lithium air battery is not limited. Examples of the shape include a coin shape, a button shape, a sheet shape, a stack shape, a cylinder shape, a panel shape, or a cone shape. Also, the lithium air battery may be used in a large battery for electrical vehicles.

Hereinafter are definitions of substituents used in the chemical formulas.

As used herein, the term "alkyl" refers to a fully saturated branched or unbranched (or straight chain or linear) hydrocarbon. Examples of the "alkyl" group may include methyl, ethyl, n-propyl, iso-propyl, n-butyl, iso-butyl, sec-butyl, n-pentyl, iso-pentyl, neo-pentyl, iso-amyl, n-hexyl, 3-methylhexyl, 2,2-dimethylpentyl, 2,3-dimethylpentyl, and n-heptyl.

At least one hydrogen atom of the "alkyl" group may be substituted with a halogen atom, a C1-C20 alkyl group substituted with a halogen atom (e.g.: $CCF_3$, $CHCF_2$, $CH_2F$, or $CCl_3$), a C1-C20 alkoxy, a C2-C20 alkoxyalkyl group, a hydroxy group, a nitro group, a cyano group, an amino group, an amidino group, a hydrazine group, a hydrazone group, a carboxylic acid or a salt thereof, a sulfonyl group, a sulfamoyl group, a sulfonic acid or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, and a C6-C20 heteroarylalkyl group.

As used herein, the term "heteroalkyl" group indicates an alkyl group as defined above in which at least one carbon atom is replaced with a heteroatom selected from nitrogen (N), oxygen (O), phosphorus (P), or sulfur (S) and having carbon as remaining atoms. Non-limiting examples of the heteroalkyl are methylthio, dimethylamino, and the like. The $C_1$-$C_{20}$ heteroalkyl group does not include the $C_1$-$C_{20}$ alkoxy group.

As used herein, the term "a halogen atom" includes fluorine, bromine, chlorine, and iodine.

As used herein, the term "a C1-C20 alkyl group substituted with a halogen atom" refers to a C1-C20 alkyl group, in which at least one halo group is substituted. Examples of the C1-C20 alkyl group substituted with a halogen atom may include monohaloalkyl, dihaloalkyl, or polyhaloalkyl including perhaloalkyl.

Monohaloalkyl refers to an alkyl group having one iodine, bromine, chlorine, or fluorine, and dihaloalkyl or polyhaloalkyl refers to an alkyl group having at least two halogen atoms that are identical to or different from each other.

As used herein, the term "alkoxy" refers to alkyl-O—, and the alkyl group is the same as defined above. Examples of the alkoxy group may include methoxy, ethoxy propoxy, 2-propoxy, butoxy, tert-butoxy, pentyloxy, hexyloxy, cyclopropoxy, and cyclohexyloxy. At least one hydrogen atom of the alkoxy group may be substituted with the same substituent groups as described above with reference to the alkyl group.

As used herein, the term "alkyloxyalkyl" refers to an alkyl group substituted by the alkoxy group described above. At least one hydrogen atom of the alkoxyalkyl may be substituted with the same substituent groups as described above with reference to the alkyl group. In this regard, the term "alkoxyalkyl" includes a substituted alkoxyalkyl moiety.

As used herein, the term "alkenyl" refers to a branched or unbranched hydrocarbon having at least one carbon-carbon double bond. Examples of the alkenyl group may include vinyl, allyl, butenyl, iso-propenyl, and iso-butenyl. At least one hydrogen of the alkenyl may be substituted with the same substituent groups as described above with reference to the alkyl group.

As used herein, the term "alkynyl" refers to a branched or unbranched hydrocarbon having at least one carbon-carbon triple bond. Examples of the alkynyl group may include ethynyl, butynyl, iso-butynyl, and iso-propynyl.

At least one hydrogen of the alkynyl may be substituted with the same substituent groups as described above with reference to the alkyl group.

As used herein, the term "aryl" is used alone or in combination and refers to an aromatic hydrocarbon including at least one ring.

The term "aryl" refers to a group in which the aromatic ring is fused to at least one cycloalkyl ring.

Examples of the aryl may include phenyl, naphthyl, and tetrahydronaphthyl.

Also, at least one hydrogen atom of the aryl group may be substituted with the same substituent groups as described above with reference to the alkyl group.

As used herein, the term "arylalkyl" refers to an alkyl substituted with aryl. Examples of arylalkyl include benzyl or phenyl-$CH_2CH_2$—.

As used herein, the term "aryloxy" refers to —O-aryl. Examples of the aryloxy include phenoxy. At least one hydrogen atom of the aryloxy group may be substituted with the same substituent groups as described above with reference to the alkyl group.

As used herein, the term "heteroaryl" refers to a monocyclic or a bicyclic organic compound including at least one heteroatom selected from N, O, P, or S, and carbon as the remaining ring atoms. The heteroaryl group, for example, may include 1 to 5 hetero atoms, or 5 to 10 ring members, wherein S or N may be oxidized to various oxidation states.

At least one hydrogen atoms of the heteroaryl group may be substituted with the same substituent groups as described above with reference to the alkyl group.

As used herein, the term "heteroarylalkyl" refers to an alkyl substituted with heteroaryl.

As used herein, the term "heteroaryloxy" refers to —O-heteroaryl moiety. At least one hydrogen atom of the heteroaryloxy group may be substituted with the same substituent groups as described above with reference to the alkyl group.

As used herein, the term "heteroaryloxyalkyl" refers to an alkyl substituted with heteroaryloxy. At least one hydrogen atom of the heteroaryloxyalkyl group may be substituted with the same substituent groups as described above with reference to the alkyl group.

As used herein, the terms "arylalkyl" and "heteroarylalkyl" refer to an alkyl group bound to an aryl group and an alkyl group bound to a heteroaryl group, respectively.

As used herein, the term "carbocyclic" refers to a fully or partially saturated or unsaturated non-aromatic monocyclic, bicyclic, or tricyclic hydrocarbon.

Examples of the monocyclic hydrocarbon may include cyclopentyl, cyclopentenyl, cyclohexyl, cyclohexyl, and cyclohexenyl; and examples of the bicyclic hydrocarbon may include bornyl, decahydronaphthyl, bicyclo[2.1.1]hexyl, bicyclo[2.2.1]heptyl, bicyclo[2.2.1]heptenyl, or bicyclo[2.2.2]octyl.

Examples of the tricyclic hydrocarbon may include adamantyl.

At least one carbocyclic group may be substituted with the same substituent groups as described above with reference to the alkyl group.

As used herein, the term "heterocyclic" refers to a 5- to 10-membered ring group including a hetero atom, such as nitrogen, sulfur, phosphorus, or oxygen, and examples of the heteroaromatic group may include pyridyl. At least one hydrogen atom of the heterocyclic group may be substituted with the same substituent groups as described above with reference to the alkyl group.

As used herein, the term "heterocyclicoxy" refers to a —O-heterocyclic group, and at least one hydrogen atom of the heterocyclicoxy group may be substituted with the same substituent groups as described above with reference to the alkyl group.

As used herein, the term "sulfonyl" refers to R"—$SO_2$—, wherein, R" is a hydrogen, alkyl, aryl, heteroaryl, aryl-alkyl, heteroaryl-alkyl, alkoxy, aryloxy, cycloalkyl group, or hetero cyclic group.

As used herein, the term "sulfamoyl" refers to $H_2NS(O_2)$—, alkyl-$NHS(O_2)$—, $(alkyl)_2NS(O_2)$-aryl-$NHS(O_2)$—, alkyl(aryl)-$NS(O_2)$—, $(aryl)_2NS(O)_2$, heteroaryl-$NHS(O_2)$—, (aryl-alkyl)-$NHS(O_2)$—, or (heteroaryl-alkyl)-$NHS(O_2)$—.

At least one hydrogen atom of the sulfamoyl group may be substituted with the same substituent groups as described above with reference to the alkyl group.

As used herein, the term "amino" refers to a nitrogen atom covalently bonded to at least one carbon or a hetero atom. An amino group includes, for example, —$NH_2$ and its substituted analogs. Also, an amino group includes "alkylamino" in which a nitrogen atom is bonded to at least one additional alkyl group, or "diarylamino" in which nitrogen is bonded to at least one or two independently selected aryl groups.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1-C30 alkyl" refers to a C1-C30 alkyl group substituted with C6-C30 aryl group, the total number of carbon atoms in the resulting aryl substituted alkyl group is C7-C60.

Thereinafter, one or more embodiments will be described in detail with reference to the following examples. However, these examples are not intended to limit the scope of the one or more embodiments.

EXAMPLES

Example 1

4 percent by weight (wt %) of a light initiator (Darocur® 1173, BASF) with respect to perfluoropolyethylene was added to a solution prepared by mixing perfluoropolyethylene (PFPE, Fluorolink® MD-700, Solvay) and ionic liquid N-diethyl-N-methyl-N-methoxyethylammonium bis(trifluoromethanesulfonyl)imide (DEMA-TFSI) containing 0.5 molar (M) Li-TFSI at a weight ratio of 1:0.2, and the resulting solution was coated on a glass plate. The glass plate was irradiated with UV for 10 minutes to prepare a solid polymer electrolyte.

Example 2

A solid polymer electrolyte was prepared in the same manner as in Example 1, except that PFPE and DEMA-TFSI containing 0.5 M Li-TFSI were mixed at a weight ratio of 1:0.14, and that an amount of the light initiator was 1 wt % with respect to PFPE.

Example 3

4 wt % of the light initiator with respect to PFPE was added to a solution prepared by mixing PFPE and DEMA-TFSI containing 0.5 M Li-TFSI at a weight ratio of 1:0.2, and a polyethylene separator (Celgard® 3501) was impregnated with the solution, and the separator was irradiated with UV to prepare a solid polymer electrolyte.

Example 4

4 wt % of the light initiator with respect to PFPE was added to a solution prepared by mixing PFPE and dibutylphthalate (DBP) at a weight ratio of 1:0.2. Then, the solution was coated on a glass plate, and the glass plate was irradiated with UV to prepare a free-standing layer. The free-standing layer was embedded in ethanol for 6 hours to remove DBP, and dried to prepare a porous layer. Next, the porous layer was impregnated with DEMA-TFSI containing 0.5 M Li-TFSI at 60° C. for 4 hours to prepare a solid polymer electrolyte.

Comparative Example 1

A liquid electrolyte was prepared by adding $LiPF_6$ in a solvent mixture including ethylene carbonate (EC), diethylene carbonate (DEC), and fluoroethylene carbonate (FEC) at a volume ratio of 20:60:20 so that a concentration of the solution was 1.3 M.

Evaluation Example 1: Morphology Observation

Figure 4:
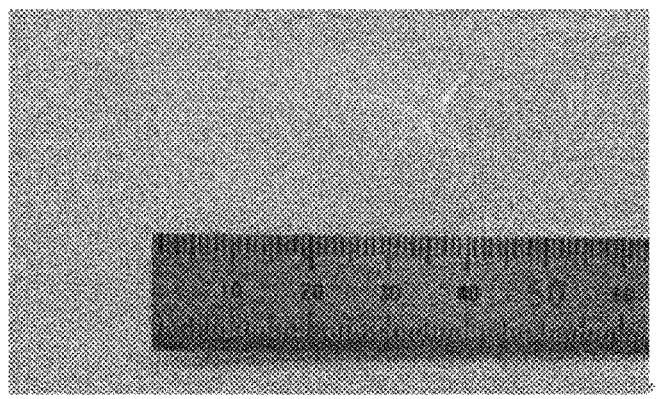
FIG. 4 is an image of a solid polymer electrolyte prepared in Example 1.

The solid polymer electrolyte prepared in Example 1 was prepared in the form of film that is semitransparent and has flexibility as shown in FIG. 4.

The solid polymer electrolyte prepared in Example 1 was embedded in ethanol to remove the ionic liquid, and a fine structure of the matrix was observed by using a field emission scanning electron microscope (FE-SEM). A surface SEM image of the matrix is shown in FIGS. 5A and 5B, and a cross-sectional SEM image of the matrix is shown in FIG. 5C.

Figure 5A:
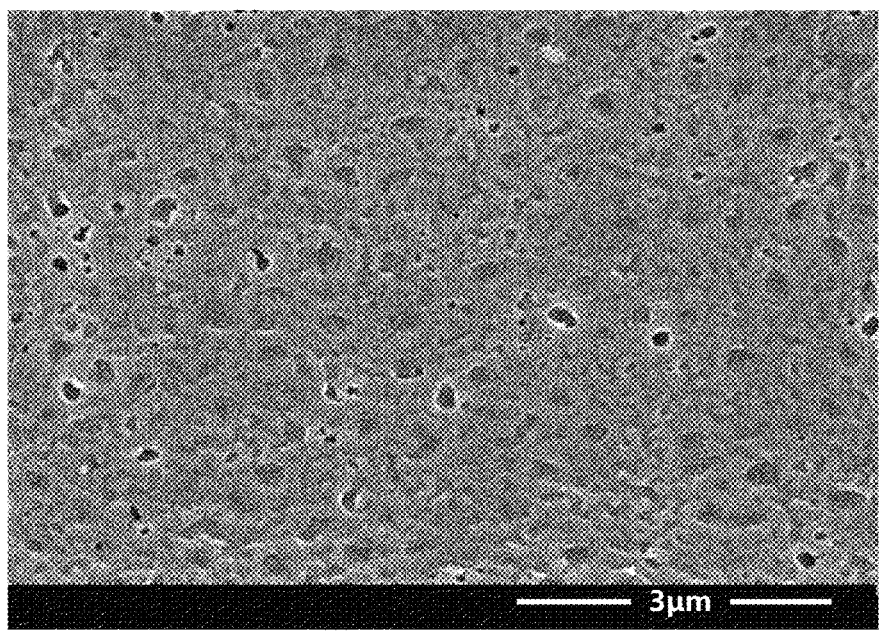
FIGS. 5A and 5B are field emission scanning electron microscope (FE-SEM) images of a surface of a matrix of the solid polymer electrolyte prepared in Example 1 from which ionic liquid is removed.
Figure 5B:
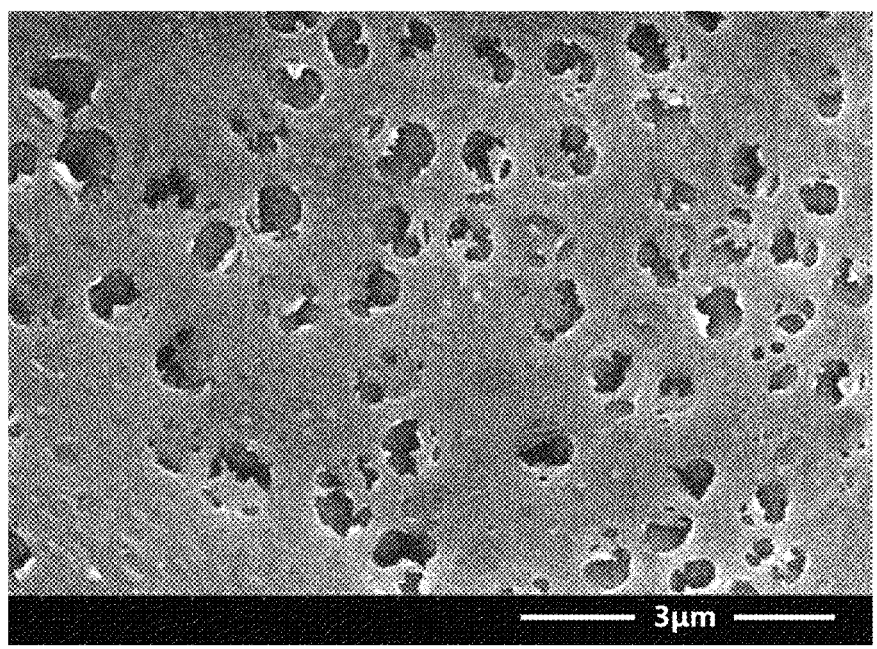
Figure 5C:
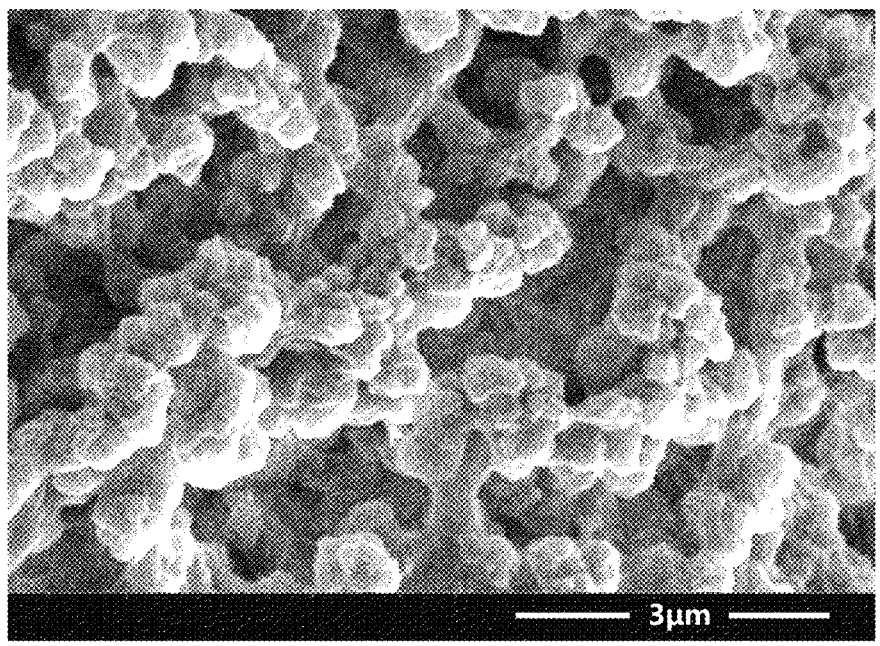
FIG. 5C is an FE-SEM image of a cross-section of the matrix.

As shown in FIGS. 5A to 5C, the solid polymer electrolyte has a porous matrix, and the ionic liquid may be impregnated in pores of the matrix.

Evaluation Example 2: Thermal Stability Evaluation

Figure 6:
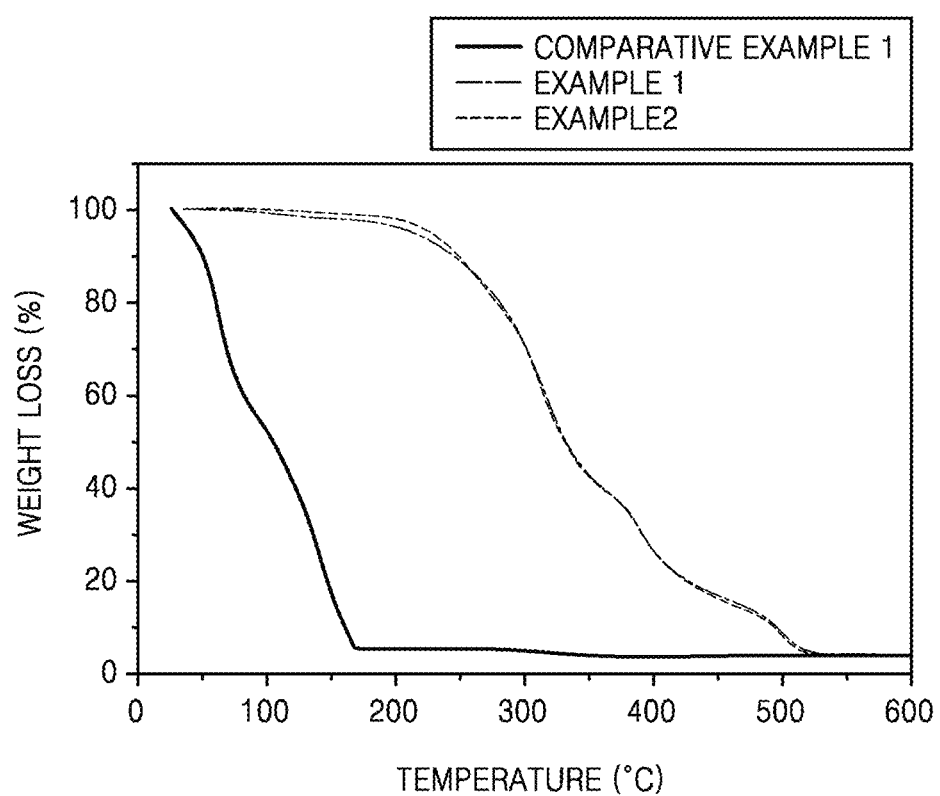
FIG. 6 is a graph of weight loss (percent, %) versus temperature (degrees Centigrade, ° C.) showing the results of thermal stability evaluation of the solid polymer electrolytes prepared in Examples 1 and 2.

Thermal stability of the solid polymer electrolytes prepared in Examples 1 and 2 and the liquid electrolyte prepared in Comparative Example 1 were evaluated by using thermogravimetric analysis (TGA), and the results are shown in FIG. 6. TGA was measured in a nitrogen atmosphere, and a temperature increasing rate was 10 degrees Centigrade per minute (° C./min).

As shown in FIG. 6, the weight of the liquid electrolyte of Comparative Example 1 continuously decreased as it was evaporating with the increase in temperature. The liquid electrolyte evaporated completely before a temperature of about 170° C., while the solid polymer electrolytes of Examples 1 and 2 were stable at a temperature of about 200° C., however, slowly decomposed at a temperature of greater than about 250° C.

In this regard, one may conclude that the solid polymer electrolytes of Examples 1 and 2 have higher thermal stability compared to a liquid electrolyte.

Evaluation Example 3: Mechanical Physical Property Evaluation

Mechanical physical properties of the solid polymer electrolyte prepared in Example 1 and the liquid electrolyte prepared in Comparative Example 1 were compared.

Young's modulus, tensile strength, and elongation at break of the solid polymer electrolyte prepared in Example 1 were measured by using LR-10K available from Lloyd, and a sample was prepared by using ASTM standard D638 (Type V specimens). A tensile strength of the sample was measured at 26° C. in a relative humidity in a range of about 20% to about 40% at a tension speed of 10 centimeters per minute (cm/min).

The results of measuring the Young's modulus, tensile strength, and elongation at break are shown in Table 1. However, the mechanical physical properties of the liquid electrolyte of Comparative Example 1 were not possible to measure since the liquid electrolyte of Comparative Example 1 was liquid.

TABLE 1

|  | Example 1 | Comparative Example 1 |
|---|---|---|
| Thickness | 54.8 ± 4.4 µm | N/A |
| Young's Modulus | 12.4 ± 8.0 GPa | N/A |
| Tensile Strength | 3.1 ± 0.3 MPa | N/A |
| % Strain at break | 12.9 ± 4.1% | N/A |

As shown in Table 1, the solid polymer electrolyte prepared in Example 1 is a solid electrolyte having good mechanical properties and elasticity.

Evaluation Example 4: Ion Conductivity Evaluation

Ion conductivity of the solid polymer electrolytes prepared in Examples 1 and 3 and the liquid electrolyte prepared in Comparative Example 1 according to temperature were evaluated. The ion conductivity was measured by using an alternative current (AC) impedance technique.

10 millivolts (mV) of voltage bias was provided to the solid polymer electrolytes of Examples 1 and 3 within a frequency range of about 1 Hertz (Hz) to about 1 megahertz (MHz), and a resistance of the solid polymer electrolyte was measured at a temperature range of about 20° C. to about 100° C. under 0% relative humidity (RH) condition, to measure the ion conductivity. The results are shown in FIG. 6.

Figure 7:
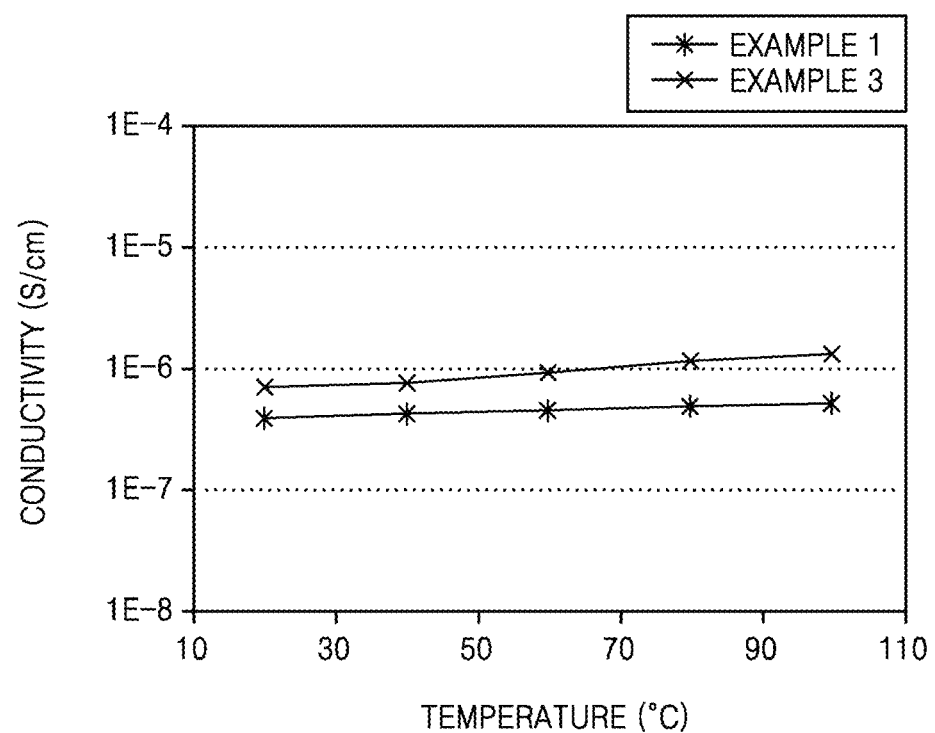
FIG. 7 is a graph of conductivity (Siemens per centimeter, (S/cm)) versus temperature (degrees Centigrade, ° C.) showing the results of ionic conductivity evaluation of the solid polymer electrolytes prepared in Examples 1 and 3.

As shown in FIG. 7, the solid polymer electrolytes of Examples 1 and 3 had stable ion conductivity of about $10^{-6}$ S/cm even at a high temperature.

Meanwhile, ion conductivity of the liquid electrolyte of Comparative Example 1 at a high temperature was not possible to measure.

As described above, according to one or more embodiments, the polymer electrolyte is in the form of a solid or gel, flexible, has high thermal stability, may be manufactured into a large amount, and may be effectively applied to manufacture of various batteries having complicated structures.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope of the present inventive concept as defined by the following claims.

What is claimed is:

1. A polymer electrolyte comprising:
   a polymer matrix comprising a cross-linked fluorine-containing polymer; and
   a liquid electrolyte embedded in the polymer matrix, wherein the liquid electrolyte comprises an ionic liquid,
   wherein the fluorine-containing polymer is a product of cross-linking a monomer represented by Formula 4:

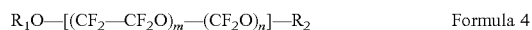

$$R_1O-[(CF_2-CF_2O)_m-(CF_2O)_n]-R_2 \quad \text{Formula 4}$$

wherein, in Formula 4,
   $R_1$ and $R_2$ are each independently an unsubstituted or substituted C1-C30 alkyl group, an unsubstituted or substituted C2-C30 alkenyl group, an unsubstituted or substituted C2-C30 alkynyl group, an unsubstituted or substituted C6-C30 aryl group, an unsubstituted or substituted C3-C30 heteroaryl group, an unsubstituted or substituted C4-C30 cycloalkyl group, or an unsubstituted or substituted C3-C30 heterocycloalkyl group, each comprising one to three cross-linkable functional groups; and
   m/n is in a range of about 0.1 to about 1,000,
   wherein the cross-linkable functional group is an acrylate group, a methacrylate group, or a combination thereof, and
   wherein the ionic liquid is an ionic liquid represented by Formula 5, an ionic liquid represented by Formula 6, or a combination thereof:

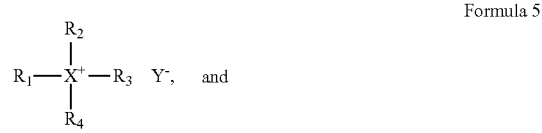

Formula 5

Formula 6 wherein, in Formulas 5 and 6,
   X is N, P, or As;
   $R_1$ to $R_4$ are each independently a hydrogen, an unsubstituted or substituted C1-C30 alkyl group, an unsubstituted or substituted C1-C30 alkoxy group, an unsubstituted or substituted C1-C30 heteroalkyl group, an unsubstituted or substituted C6-C30 aryl group, an unsubstituted or substituted C6-C30 aryloxy group, an unsubstituted or substituted C7-C30 arylalkyl group, an unsubstituted or substituted C3-C30 heteroaryl group, an unsubstituted or substituted C3-C30 heteroaryloxy group, an unsubstituted or substituted C4-C30 heteroarylalkyl group, an unsubstituted or substituted C4-C30 cycloalkyl group, or an unsubstituted or substituted C3-C30 heterocycloalkyl group;

n is in a range of 1 to 4; and $Y^-$ is an anion.

2. The polymer electrolyte of claim 1, wherein the cross-linked fluorine-containing polymer has a net structure.

3. The polymer electrolyte of claim 1, wherein a weight average molecular weight of the monomer before cross-linking into the fluorine-containing polymer is in a range of about 200 grams per mole to about 10,000,000 grams per mole.

4. The polymer electrolyte of claim 1, wherein an amount of fluorine in the monomer before cross-linking into the fluorine-containing polymer is in a range of about 10 percent by weight to about 90 percent by weight, based on a total weight of the monomer before cross-linking.

5. The polymer electrolyte of claim 1, wherein the liquid electrolyte further comprises an organic solvent.

6. The polymer electrolyte of claim 5, wherein the ionic liquid comprises:

an ammonium cation, a pyrrolidinium cation, a piperidinium cation, a phosphonium cation, or a combination thereof; and an anion.

7. The polymer electrolyte of claim 6, wherein the anion comprises $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2S_{O3}^-$, $SF_5CHFCF_2S_{O3}^-$, $CF_3CF_2(CF_3)_2C_O^-$, $(CF_3S_{O2})_2CH^-$, $(SF_5)_3C^-$, $(O(CF_3)_2C_2(CF_3)_2O)_2PO^-$, or a combination thereof.

8. The polymer electrolyte of claim 5, wherein the ionic liquid comprises a quaternary ammonium ionic liquid represented by Formula 5a, a pyrrolidinium ionic liquid represented by Formula 6a, a piperidinium ionic liquid represented by Formula 6b, or a combination thereof:

Formula 5a $$R_1-\overset{R_2}{\underset{R_4}{\overset{|}{N^+}}}-R_3 \quad Y^-,$$

Formula 6a

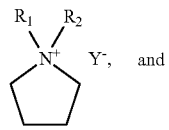

and

Formula 6b

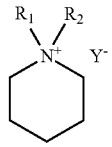

wherein, in Formulas 5a, 6a, and 6b, $R_1$ to $R_4$ are each independently a hydrogen, an unsubstituted or substituted C1-C30 alkyl group, an unsubstituted or substituted C1-C30 alkoxy group, an unsubstituted or substituted C1-C30 heteroalkyl group, an unsubstituted or substituted C6-C30 aryl group, an unsubstituted or substituted C6-C30 aryloxy group, an unsubstituted or substituted C7-C30 arylalkyl group, an unsubstituted or substituted C3-C30 heteroaryl group, an unsubstituted or substituted C3-C30 heteroaryloxy group, an unsubstituted or substituted C4-C30 heteroarylalkyl group, an unsubstituted or substituted C4-C30 cycloalkyl group, or an unsubstituted or substituted C3-C30 heterocycloalkyl group;

n is in a range of 1 to 4; and $Y^-$ is an anion.

9. The polymer electrolyte of claim 5, wherein the ionic liquid comprises diethyl methyl ammonium trifluoromethane sulfonate, dimethyl propyl ammonium trifluoromethane sulfonate, N,N-diethyl-N-methyl-N-(2-methoxyethyl)ammonium bis(trifluoromethane sulfonyl)imide, N-methyl-N-propyl piperidinium bis(trifluoromethane sulfonyl)imide, N-butyl-N-methylpyrrolidinium bis(trifluoromethane sulfonyl)imide, methyl propyl piperidinium trifluoromethane sulfonyl imide, or a combination thereof.

10. The polymer electrolyte of claim 5, wherein the organic solvent comprises a carbonate solvent, a glyme solvent, a dioxolane solvent, or a combination thereof.

11. The polymer electrolyte of claim 1, wherein the liquid electrolyte further comprises a lithium salt, and wherein the lithium salt is $LiPF_6$, $LiBF_4$, $LiSbF_6$, $LiAsF_6$, $LiN(SO_2C_2F_5)_2$, $LiN(SO_2F_2)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein, x and y are each independently a natural number, LiF, LiBr, LiCl, LiI, $LiB(C_2O_4)_2$, or a combination thereof.

12. The polymer electrolyte of claim 1, wherein a weight ratio of the polymer matrix to the liquid electrolyte is in a range of about 90:10 to about 10:90.

13. The polymer electrolyte of claim 1, wherein the polymer electrolyte is a solid or gel.

14. A battery comprising the polymer electrolyte of claim 1.

15. The battery of claim 14, wherein the battery is a lithium sulfur battery, a lithium ion battery, a lithium air battery, or a lithium polymer battery.

16. The battery of claim 14, wherein the battery comprises a metal air battery, wherein the metal air battery is a lithium air battery, a sodium air battery, or a magnesium air battery.